(12) United States Patent
Commaret et al.

(10) Patent No.: US 7,661,273 B2
(45) Date of Patent: Feb. 16, 2010

(54) TURBOMACHINE WITH ANNULAR COMBUSTION CHAMBER

(75) Inventors: Patrice Andre Commaret, Rubelles (FR); Mario Cesar De Sousa, Cesson (FR); Didier Hippolyte Hernandez, Quiers (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 12/198,386

(22) Filed: Aug. 26, 2008

(65) Prior Publication Data

US 2009/0056337 A1 Mar. 5, 2009

(30) Foreign Application Priority Data

Aug. 30, 2007 (FR) .................... 07 06070

(51) Int. Cl.
*F02C 7/20* (2006.01)
(52) U.S. Cl. .................. 60/799; 60/796; 415/209.2
(58) Field of Classification Search .......... 60/752, 60/796, 799, 804, 800; 415/209.2, 209.3, 415/209.4
See application file for complete search history.

(56) References Cited

U.S. PATENT DOCUMENTS

| 2,204,829 | A | | 6/1940 | Shippee et al. | |
|---|---|---|---|---|---|
| 2,509,503 | A | | 5/1950 | Huyton | |
| 3,500,639 | A | * | 3/1970 | Stamm | 60/797 |
| 3,750,397 | A | * | 8/1973 | Cohen et al. | 60/804 |
| 4,487,015 | A | * | 12/1984 | Slattery et al. | 60/800 |
| 4,848,089 | A | | 7/1989 | Cramer | |
| 5,337,583 | A | | 8/1994 | Giles et al. | |
| 5,524,430 | A | * | 6/1996 | Mazeaud et al. | 60/798 |
| 5,916,142 | A | * | 6/1999 | Snyder et al. | 60/748 |
| 6,341,485 | B1 | * | 1/2002 | Liebe | 60/772 |
| 2002/0108378 | A1 | * | 8/2002 | Ariyoshi et al. | 60/800 |
| 2005/0058537 | A1 | * | 3/2005 | Corman et al. | 415/139 |
| 2005/0086945 | A1 | * | 4/2005 | Tiemann | 60/800 |
| 2006/0010879 | A1 | * | 1/2006 | Aumont et al. | 60/796 |

FOREIGN PATENT DOCUMENTS

| EP | 1 312 865 A1 | 5/2003 |
|---|---|---|
| EP | 1 431 665 A2 | 6/2004 |
| EP | 1 777 460 A1 | 4/2007 |
| GB | 2 263 733 A | 8/1993 |
| JP | 58-200024 | 11/1983 |

OTHER PUBLICATIONS

U.S. Appl. No. 12/190,105, filed Aug. 12, 2008, Commaret et al.

* cited by examiner

*Primary Examiner*—Michael Cuff
*Assistant Examiner*—Phutthiwat Wongwian
(74) *Attorney, Agent, or Firm*—Oblon, Spivak, McClelland, Maier & Neustadt, L.L.P.

(57) ABSTRACT

Turbomachine with an annular combustion chamber including at its upstream end an annular chamber bottom, and attached at its downstream end by annular flanges to a radially inner casing and outer casing, wherein the upstream end of the chamber is connected to the inner casing or outer casing by elastically deformable bridges.

20 Claims, 4 Drawing Sheets

TURBOMACHINE WITH ANNULAR COMBUSTION CHAMBER

The present invention relates to a turbomachine with an annular combustion chamber.

BACKGROUND OF THE INVENTION

An annular combustion chamber of a turbomachine comprises, at its upstream end a rigid, annular chamber-bottom wall and comprises at its downstream end flanges for attachment to inner and outer casings. An annular upstream fairing is attached to the chamber bottom and makes it possible to direct the airflow coming into or around the combustion chamber. The chamber bottom wall and the fairing comprise openings for the entry of air into the chamber, and for the insertion of fuel injectors. The inner and outer attachment flanges, at the downstream end of the chamber, have holes in them in order to allow the passage of the air traveling around the combustion chamber and therefore have a certain flexibility.

Such a combustion chamber has a certain number of disadvantages because of its method of attachment.

Specifically, its single downstream attachment leads to a mounting of the chamber in an overhanging manner. The vibrations generated during the operation of the turbomachine cause the upstream portion of the chamber to vibrate which leads to a misalignment between the injectors and the chamber and does not allow the production of an ideal combustion of the injected fuel. These vibrations also contribute to limiting the service life of the chamber.

It would therefore be worthwhile for the attachment flanges to be sufficiently rigid to limit the vibrations of the chamber. However, during the operation of the turbomachine, the pressure variations between the inter-casing enclosure and the outside of this enclosure and the temperature variations induce relative movements of the inner and outer casings and of the chamber walls, which requires making the downstream flanges flexible.

In certain configurations, in which the characteristics of the materials of the casings and of the chamber walls are very different, or else when the geometry of the flanges is complex, the flanges require a flexibility that is incompatible with their mechanical and aerodynamic design, necessary to comply with the vibration limits of the chamber.

SUMMARY OF THE INVENTION

The subject of the present invention is a turbomachine that prevents the aforementioned disadvantages of the prior art in a simple, effective and economical manner.

Accordingly, it proposes a turbomachine with an annular combustion chamber comprising, at its upstream end, an annular chamber bottom traversed by fuel injection means and attached at its downstream end by flexible annular flanges to radially inner and outer casings, wherein the upstream end of the chamber is connected to at least one of the inner and outer casings by elastically deformable bridges each formed of a curved spring leaf extending circumferentially and distributed about the combustion chamber, these bridges being attached by bolting to one of the inner and outer casings and resting radially on the chamber bottom or vice versa.

The elastically deformable bridges for supporting or suspending the upstream end of the chamber make it possible to absorb and cushion the vibrations generated by the turbomachine in operation. It therefore becomes possible to make the downstream flanges for attaching the chamber flexible in order to allow the relative movements necessary for the casings and the chamber walls which increases the service life of the combustion chamber.

The means for connecting the chamber to the inner or outer casing are placed at the chamber bottom, which is colder than the other portions of the chamber, which makes it possible to limit the deformations of these connecting means when the chamber heats up in operation.

It is preferable to use at least three bridges distributed about the chamber, in order to limit the vibrations of the upstream portion of the combustion chamber. The bridges fit perfectly into the mechanical environment of the injectors and of the upstream portion of the combustion chamber and do not disrupt the air flow passing round the combustion chamber. The assembly by bolting and the removal of the bridges are quick and easy to carry out which simplifies maintenance operations.

Advantageously, the radial bearing of each bridge on the inner or outer casing is achieved on a boss of the inner or outer casing which protrudes toward the chamber.

Certain of these bridges may have a closed contour and comprise a substantially flat branch resting radially on the chamber bottom or on a casing and an opposite branch whose mid-portion is curved in the direction of the first branch, the two branches being connected by U-shaped bent ends.

According to another feature of the invention, certain of these bridges have an open contour and have U-shaped or C-shaped bent ends, their spring leaf also comprising a mid-portion that is curved toward the inside of the bridge.

Orifices for attachment to the inner or outer casing or to the combustion chamber are advantageously formed at the ends of the curved mid-portion of the spring leaf.

According to another feature of the invention, the ends of the bridges each comprise at least two substantially parallel, circumferentially oriented feet, applied to a cylindrical surface of a casing or of an annular chamber.

The end feet of a bridge may extend towards one another. Certain of the feet may extend toward the inside of the bridge, the others extend toward the outside.

According to another feature of the invention, the end feet are curved in an axial direction, which ensures in operation a permanent linear contact between the bridge and the chamber or one of the casings, whatever the position and shape of the chamber.

The end feet extending toward the outside of a bridge may be nested with the end feet extending toward the outside of an adjacent bridge, which makes it possible to keep the bridges axially together.

According to yet another feature of the invention, the bent end of a bridge is in contact with the bent end of an adjacent bridge, thereby making it possible to vary the stiffness of the adjacent bridges when they are compressed. The bent portions in contact may also comprise matching undulations engaged in one another.

The bridges may be mounted with an initial prestress between at least one of the inner and outer casings and the chamber bottom, which makes it possible to ensure in operation a permanent elastic return of the bridges on the inner or outer casings and the chamber walls.

The invention also relates to a bridge providing support for an annular combustion chamber of a turbomachine as described above, which is formed of a curved spring leaf with an open or closed contour, in which attachment orifices are formed.

The spring leaf of the bridge may be made of a nickel and cobalt alloy.

BRIEF DESCRIPTION OF THE DRAWINGS

The invention will be better understood and other details, advantages and features of the invention will appear on reading the following description made as a nonlimiting example, with reference to the appended drawings in which.

DESCRIPTION OF THE PREFERRED EMBODIMENTS

Figure 1:
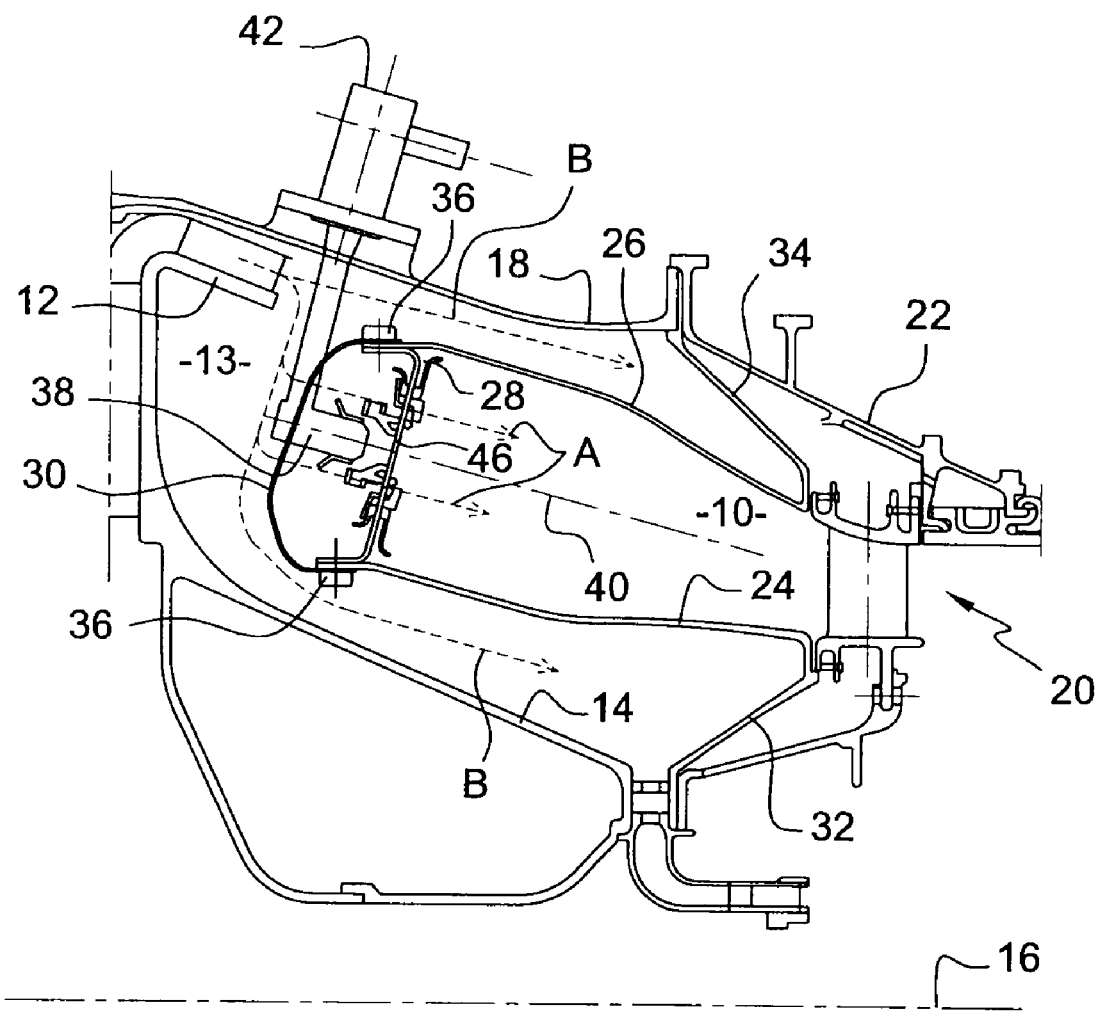
FIG. 1 is a schematic half-view in axial section of a turbomachine combustion chamber according to the prior art.

Reference is first made to FIG. 1 which represents an annular combustion chamber 10 according to the prior art and in which a centrifugal diffuser 12 mounted at the outlet of a high-pressure compressor not shown feeds air to an annular space 13 delimited by two coaxial casings, one casing 14 being radially inner relative to the axis 16 of the turbomachine and the other casing 18 being radially outer, and which contains the combustion chamber 10. This combustion chamber 10 is mounted upstream of a turbine section 20 surrounded by an outer casing 22 and comprises two walls of revolution, one inner 24 and one outer 26, substantially cylindrical and coaxial, and an annular upstream chamber-bottom wall 28 to which an annular fairing 30 is attached which extends upstream. The downstream ends of the walls 24, 26 are connected to the casings 14 and 18, respectively by annular flanges 32 and 34. The upstream ends of the radially inner wall of revolution 24 and outer wall of revolution 26 are attached to the radially inner and radially outer edges of the chamber-bottom wall 28 and of the fairing 30, respectively, by bolts 36.

The chamber-bottom wall 28 supports injector nozzles 38 which lead into the combustion chamber 10 and which are oriented along the axis 40 of this chamber 10. Each injector 38 extends through an orifice of the fairing 30 and comprises a bent portion which travels round the upstream outer edge of the fairing 30 and is connected to fuel supply means 42 supported by the outer casing 18.

In operation, the air flow supplied by the high-pressure compressor and exiting the diffuser 12 is guided by the fairing 30 and is divided into a portion A which passes through the air inlet orifices of the fairing 30 and through matching orifices 44 of the chamber bottom 28 in order to supply the combustion chamber 10, and into two portions B which travel round the combustion chamber 10.

In the prior art, the combustion chamber 10 is attached only by its downstream flanges 32, 34 to the outer casings 18, 22 and inner casing 14 and the upstream portion of the combustion chamber 10 is therefore overhanging. The whole weight of the chamber 10 is therefore supported by the inner flange 32 and outer flange 34, which should be sufficiently rigid to prevent the vibrations of the upstream portion of the chamber 10, which may cause misalignments of the injectors 38 with the axis 40 of the chamber and damage the injector nozzles 38 supported by the wall of the chamber bottom 28.

However, the downstream flanges 32, 34 must also be sufficiently flexible to allow relative movements of the chamber 10 and the casings 14, 18 because of the pressure variations and the temperature increases.

The production of the inner flange 32 and outer flange 34 therefore is the result of a compromise between flexibility and rigidity which is not always easy to achieve.

An upstream attachment of the combustion chamber 10 cannot be achieved by means of a flange similar to that used for the downstream attachment. Indeed, it would assume having a flange in the zone for bypassing the chamber 10, which would disrupt the airflow, and attaching this flange in the zone for attachment of the injectors 38, which is difficult to achieve because of the small amount of available space.

Figure 2:
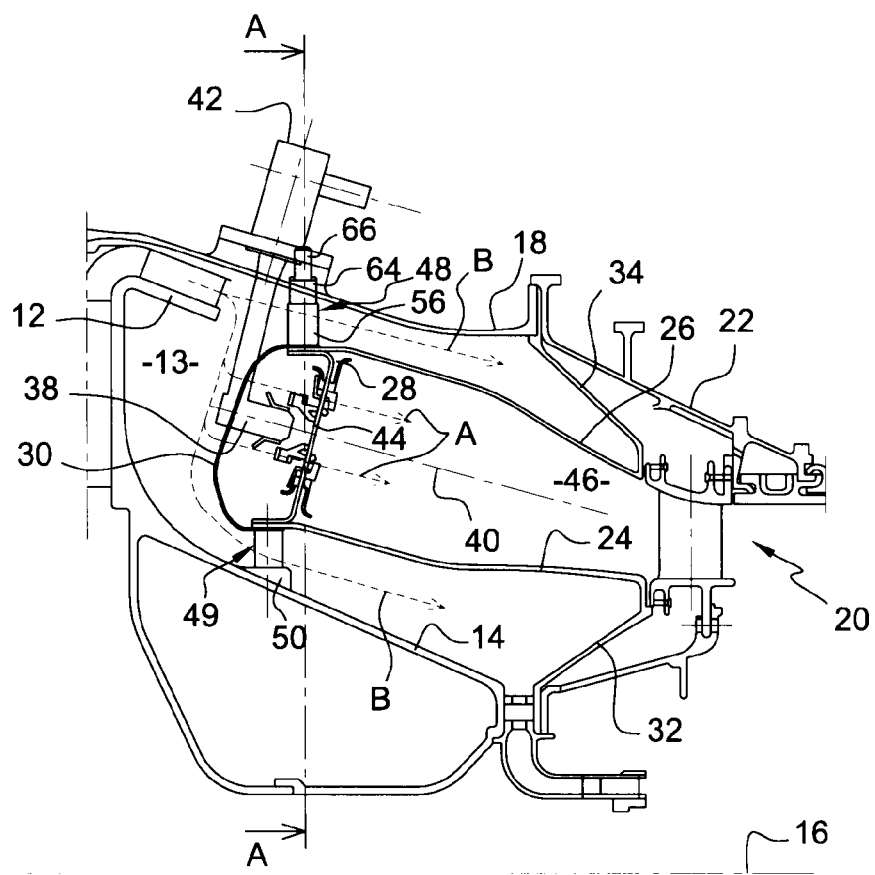
FIG. 2 is a schematic half-view in axial section of a turbomachine combustion chamber according to the invention.

According to the invention, these disadvantages and those mentioned above are prevented thanks to the fact that, as shown in FIG. 2, the combustion chamber 46 is connected at its upstream end to the inner casing 14 and outer casing 18 by means that are elastically deformable and have a variable stiffness.

These elastically deformable means comprise bridges 48 formed by curved spring leaves that radially connect the inner casing 14 and outer casing 18 to the upstream ends of the inner wall 24 and outer wall 26 of the combustion chamber 46. The use of the bridges 48 makes it possible to hold the upstream portion of the chamber 46 and therefore to absorb a portion of the vibrations of the chamber 46. It is then possible to make the downstream inner flange 32 and outer flange 34 more flexible, which increases the service life of the chamber 46.

The combustion chamber 46 is connected to the inner casing 14 or outer casing 18 by at least three bridges distributed about the chamber, in order to allow a good stabilization of the chamber 46 in operation and to compensate for the effects of the initial mounting of the latter in an overhanging manner between the inner casing 14 and outer casing 18.

In the embodiment shown in FIG. 2, the combustion chamber 46 is held upstream by inner bridges 49 and outer bridges 48, the inner bridges 49 being placed upstream of the outer bridges 48. Each outer bridge 48 is attached to the outer casing 18 by bolting and rests radially on the outer wall 26 and on a radially outer edge of the chamber bottom 28, each inner bridge 49 being attached by bolting to the inner wall 24 and to a radially inner edge of the chamber bottom 28 and resting radially on the inner casing 14. The radial resting of each inner bridge 49 takes place on a boss 50 of the inner casing 14 extending toward the combustion chamber 46.

The substantially radial orientation of the bridges 48 and 49 makes it possible to absorb and cushion the radial vibrations of the upstream portion of the chamber 48 in operation.

Figure 3:
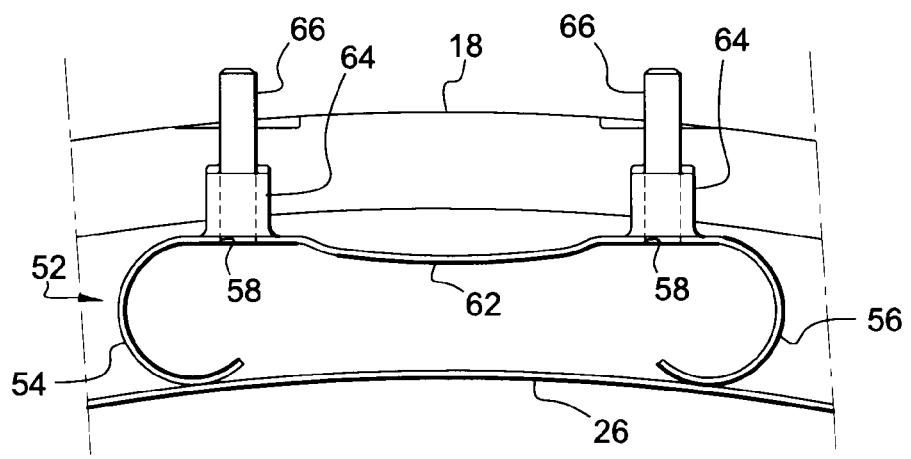
FIG. 3 is a partial view on a larger scale and in section along the line A-A of the upstream portion of the combustion chamber of FIG. 2.

As shown in FIG. 3, a bridge may be formed by a spring leaf 52 with an open contour and whose ends 54, 56 are bent like a C. The spring leaf 52 comprises orifices 58 on either side of a mid-portion 62 curved toward the inside of the bridge. Posts 64 comprising longitudinal orifices are attached to the orifices 58 and threaded rods 66 are inserted into the posts 64 and into the orifices 58 of the bridge and are screwed onto the outer casing 18. In this embodiment, the bridge 52 is attached to the outer casing and rests radially on the outer wall 26 of the combustion chamber 46.

When the turbomachine is operating, the inner casing 14 and outer casing 18 and the walls 24 and 26 of the chamber 46 expand radially under the effect of the heat generated by the combustion. The bridges may also deform to compensate for the expansion thanks to their curved mid-portion 62 elongating circumferentially.

In a variant of the invention (FIG. 4), the ends 68, 70 of the spring leaf 71 are curved like a U and each comprise a foot 72, 74, which may be curved in the axial direction, in order to allow a linear contact between the bridge and the chamber or one of the inner casing 14 or outer casing 18, the two feet 72, 74 of a bridge being oriented circumferentially one toward the other.

Figure 4:
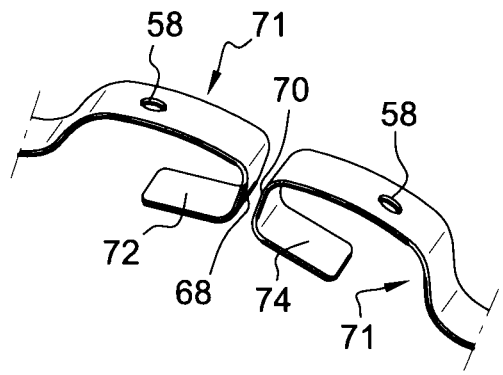
FIG. 4 is a partial schematic view in perspective of two adjacent bridges with no contact.
Figure 5:
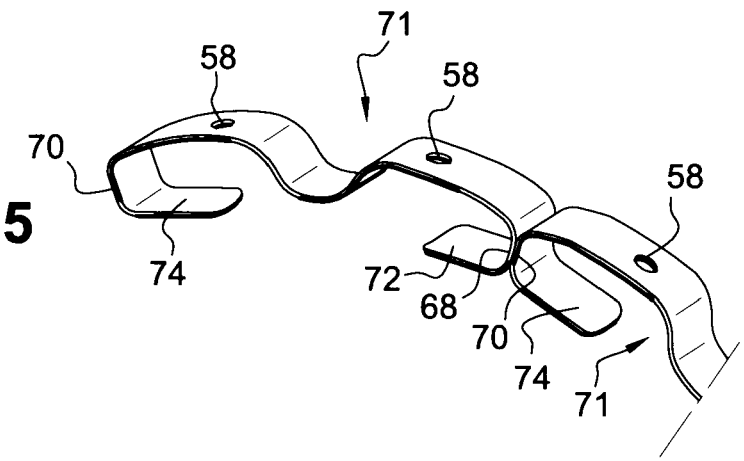
FIG. 5 is a partial schematic view in perspective of two adjacent bridges whose curved ends are in contact.

The bridges distributed over the circumference of the combustion chamber may have different stiffnesses in order to better absorb the vibrations of the turbomachine in operation. It is also possible to have the stiffness of the bridges vary by incorporating them in a particular manner around the combustion chamber. For example, two adjacent bridges may be mounted inside the combustion chamber so that a space is retained between them while the turbomachine is at rest (FIG. 4). During the operation of the turbomachine, the deformations of the chamber 46 and of the casings 14, 18 lead the bent ends 68, 70 of the spring leaves 71 to come into contact (FIG. 5), which modifies the stiffness of the assembly made up of the two spring leaves 71 and makes the connection rigid between the inner casing 14 or outer casing 18 and the chamber 46.

Figure 6:
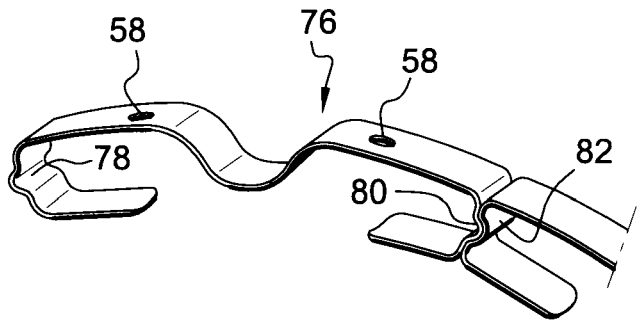
FIGS. 6 and 7 are schematic views in perspective of two adjacent bridges whose curved ends are in contact and comprise matching undulations.
Figure 7:
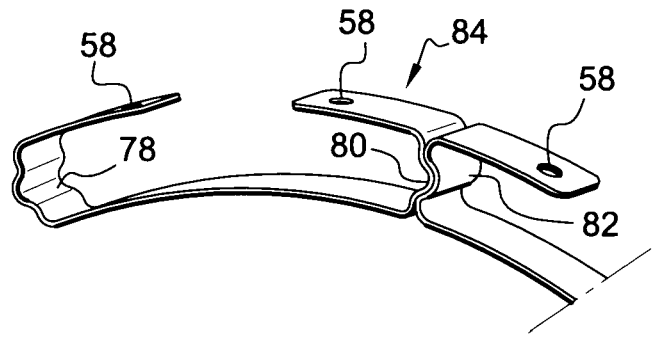

It is possible to produce different surfaces of contact between adjacent bridges. FIGS. 6 and 7 represent a bridge 76, 84 whose curved ends 78, 80 comprise radial undulations engaged in matching undulations formed at the curved ends 82 of an adjacent bridge.

The bridge 84 represented in FIG. 7 has a shape similar to the spring leaves previously described except that the attachment orifices 58 are formed at the ends of the spring leaf 84 and that the latter does not have a curved mid-portion. Such a bridge has a stiffness that is again different from that of the bridges with a curved mid-portion.

Figure 8:
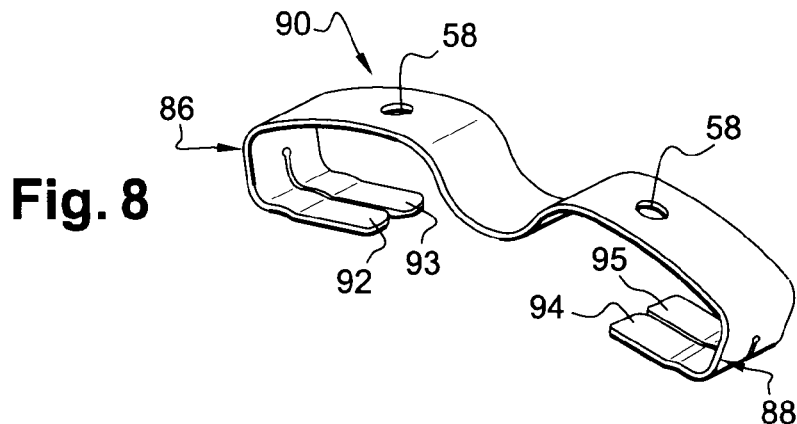
FIG. 8 is a view in perspective of a spring leaf comprising two end feet.

In a variant of the invention shown in FIG. 8, the curved ends 86, 88 of the spring leaf 90 each comprise two substantially parallel feet 92, 93 and 94, 95. The feet of each of the curved ends 86, 88 extend circumferentially one towards the others. The feet are designed to be pressed on the inner casing 14 or outer casing 18 or onto one of the walls of revolution, the inner wall 24 or outer wall 26, of the combustion chamber 46 and make it possible to damp the axial vibrations of the chamber 46 in operation.

Figure 9:
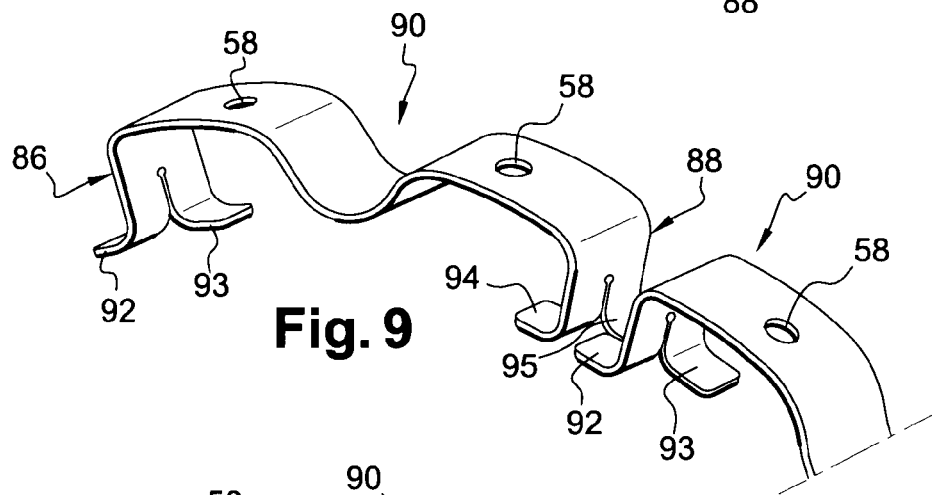
FIGS. 9 and 10 are partial schematic views in perspective of two spring leaves whose end feet are nested in one another.

In another variant of the invention shown in FIG. 9, the two feet 92, 93 of one end of the spring leaf of a bridge are such that one foot 93 is oriented toward the inside of the leaf and the other foot 92 is oriented toward the outside. Each of the feet 94, 95 of the other end of the spring leaf 90 is oriented in the same manner as the foot with which it is circumferentially aligned. Such a configuration makes it possible to axially align the foot 92 of a spring leaf with the foot 95 of the adjacent spring leaf, and makes it possible to fixedly maintain in axial direction the spring leaves 90 of two adjacent bridges.

Figure 10:
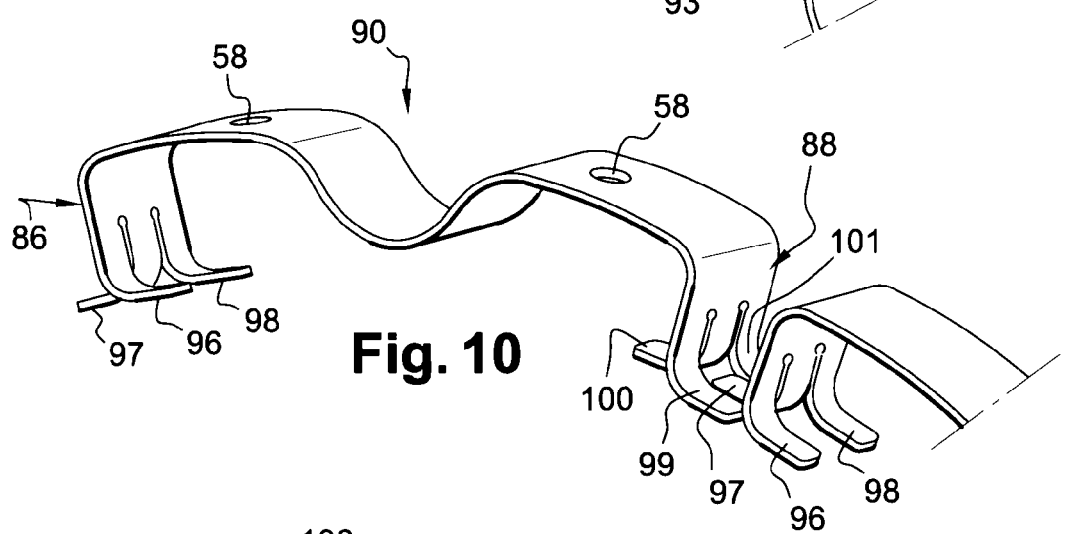

In the exemplary embodiment shown in FIG. 10, each of the curved ends 86, 88 comprises three circumferentially extending feet 96, 97, 98 and 99, 100, 101. The middle foot 97 of the curved end 86 is oriented toward the outside of the spring leaf, while the other two feet 96, 98 are oriented toward the inside. The middle foot 100 of the curved end 88 is oriented toward the inside of the spring leaf, while the other two feet 99, 101 are oriented toward the outside. In a manner similar to the previous embodiment, the end feet oriented toward the outside 99, 101 are placed axially in alternation and nested with the foot oriented toward the outside 97 of the adjacent bridge.

Figure 11:
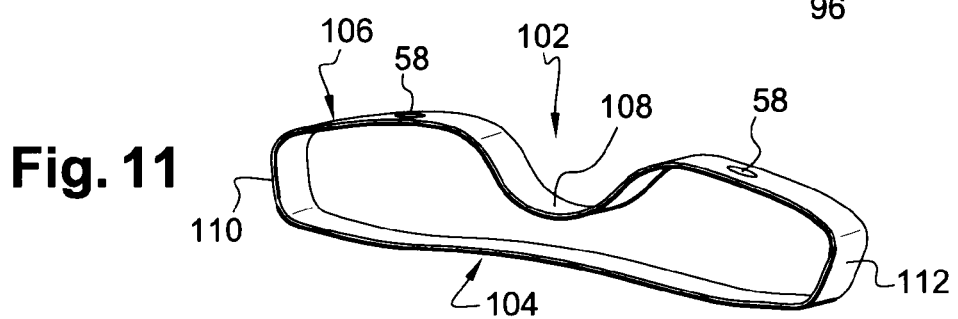
FIG. 11 is a schematic view in perspective of a bridge with a closed contour according to the invention.

In a variant of the invention shown in FIG. 11, the bridge 102 has a closed contour and comprises a first branch 104 that is substantially flat and a second branch 106 that is opposite to the first branch 104 and whose mid-portion 108 is curved in the direction of the first branch 104. The two branches 104, 106 are connected at their ends by portions 110, 112 bent like a U. Orifices 58 are also formed on either side of the curved mid-portion 108, which may also lengthen in the event of expansion or deformation of the part to which it is attached, in a manner similar to the spring leaves previously described. Such a bridge has a stiffness that is different from that of a spring leaf with an open contour.

According to possible variants of the invention, it is possible to place bridges only between the inner casing 14 and the inner wall 24 of the chamber 46 or only between the outer casing 18 and the outer wall 26 of the chamber 46. It is equally possible to place bridges both inside and outside. The inner bridges may be in whole or in part resting radially on the inner wall 24 and bolted to the inner casing 14 or resting radially on the inner casing 14 and bolted to the inner wall 24. Similarly, outer bridges may be wholly or in part resting radially on the outer wall 26 and bolted to the outer casing 18 or resting radially on the outer casing 18 and bolted to the outer wall 26. The outer casing 18 may comprise bosses extending toward the chamber 46 in a manner similar to the boss 50 of the inner casing 14 shown in FIG. 2 in order to allow bridges to rest radially.

The bridges may be attached by bolting to the chamber bottom 28, by using the elements for bolting the inner wall 24 or outer wall 26 to the chamber bottom 28, which prevents making additional drill holes and adding weight to the turbomachine by adding additional bolting parts.

Other arrangements of the bridges may be imagined without departing from the context of the invention, in particular it is possible to imagine coupling bridges of different shape, such as for example the spring leaf described with reference to FIG. 7 with the bridge described in FIG. 8 in order to obtain a particular stiffness for the connection between the inner casing 14 or outer casing 18 and the chamber. It is also possible to combine closed-contour bridges 102 with bridges of the open contour type.

As can be seen in the drawings, the bridges have a generally circumferentially curved shape which makes it easier to place bridges between the inner casing 14 and outer casing 18 and the walls of the chamber. In addition, their shape offers only a slight resistance to the air traveling round the combustion chamber 46 (FIG. 3).

In one embodiment of the invention, the bridges are preferably mounted only between the inner casing 14 and the inner wall 24 of the chamber 46, because the inner casing 14 sustains a lesser pressure differential in operation than that sustained by the outer casing 18. The bridges arranged internally are therefore less likely to deform.

The bridges may advantageously be mounted internally or externally in a prestressed state, in order to ensure a permanent elastic return between the inner casing 14 or outer casing 18 and the walls of the chamber 46.

The integration of the bridges is carried out at the upstream end of the chamber 46 corresponding to the coldest zone of the combustion chamber 46, which limits the effects of the high combustion temperature on the bridges.

The material used for producing the bridges must be compatible with the materials of the casings and of the chamber in order to prevent too much friction between the surfaces in contact. This material must also be able to withstand a temperature of more than 600° C. corresponding to the temperature in the zone of the bridges. The bridges may therefore be made of a nickel and cobalt alloy.

The invention claimed is:

1. A turbomachine with an annular combustion chamber comprising, at an upstream end of said combustion chamber, an annular bottom wall provided with fuel injectors, said combustion chamber having a downstream end attached by flexible annular flanges to radially inner and outer casings, the upstream end of the chamber being connected to at least one of the inner and outer casings by elastically deformable bridges each formed of a curved spring leaf extending circumferentially and distributed about the combustion chamber, said bridges being attached by bolting to one of the inner and outer casings and resting radially on the annular bottom wall or vice versa.

2. The turbomachine as claimed in claim 1, wherein at least one of the inner and outer casings comprises a boss protruding towards the chamber allowing the radial resting of the bridge.

3. The turbomachine as claimed in claim 1, wherein certain of the bridges have a closed contour and comprise a substantially flat branch resting radially on the annular bottom wall or on a casing and an opposite branch whose mid-portion is curved in the direction of the first branch, the two branches being connected by U-shaped bent ends.

4. The turbomachine as claimed in claim 3, wherein the ends of the curved mid-portion comprise orifices for attachment to the inner or outer casing or to the combustion chamber.

5. The turbomachine as claimed in claim 1, wherein certain bridges have an open contour and comprise a mid-portion curved toward the inside of the bridge with U-shaped or C-shaped bent ends.

6. The turbomachine as claimed in claim 5, wherein the ends of the curved mid-portion of the spring leaf comprise orifices for attachment to the inner or outer casing or to the combustion chamber.

7. The turbomachine as claimed in claim 5, wherein the ends of the bridges each comprise at least two substantially parallel, circumferentially oriented feet, applied to a cylindrical surface of a casing or of an annular chamber.

8. The turbomachine as claimed in claim 7, wherein the end feet of a bridge extend toward one another.

9. The turbomachine as claimed in claim 7, wherein the end feet are curved in an axial direction.

10. The turbomachine as claimed in claim 7, wherein certain end feet extend toward the inside of the bridge, the other feet extending toward the outside of the bridge.

11. The turbomachine as claimed in claim 10, wherein the end feet extending toward the outside of a bridge are nested with the end feet extending toward the outside of an adjacent bridge.

12. The turbomachine as claimed in claim 3, wherein the bent end of a bridge in contact with the bent end of an adjacent bridge.

13. The turbomachine as claimed in claim 12, wherein the bent ends in contact comprise matching undulations engaged in one another.

14. The turbomachine as claimed in claim 1, wherein the bridges are mounted with an initial prestress between at least one of the inner and outer casings and the annular bottom wall.

15. A bridge providing support for an annular combustion chamber of a turbomachine as claimed in claim 1, wherein the curved spring leaf is formed with an open or closed contour in which attachment orifices are formed.

16. The bridge as claimed in claim 15, wherein the spring leaf is made of nickel and cobalt alloy.

17. The turbomachine as claimed in claim 1, wherein said bridges are attached by bolting to the inner and outer casings and rest radially on the annular bottom wall.

18. The turbomachine as claimed in claim 1, wherein said bridges rest radially on the inner and outer casings and are attached by bolting to the annular bottom wall.

19. The turbomachine as claimed in claim 1, wherein said bridges have different stiffnesses.

20. The turbomachine as claimed in claim 1, wherein said flexible annular flanges attaching the downstream end of the combustion chamber to the radially inner and outer casings are sufficiently flexible to allow relative movement between the combustion chamber and the casings.

* * * * *